United States Patent [19]

Stoll

[11] Patent Number: 4,762,460
[45] Date of Patent: Aug. 9, 1988

[54] POSITIONING DEVICE

[76] Inventor: Kurt Stoll, Lenzhalde 72, 7300 Esslingen, Fed. Rep. of Germany

[21] Appl. No.: 68,912

[22] Filed: Jun. 29, 1987

[30] Foreign Application Priority Data

Jul. 4, 1986 [DE] Fed. Rep. of Germany ....... 3622473

[51] Int. Cl.⁴ ............................................. B65G 25/00
[52] U.S. Cl. ................................ 414/750; 198/468.2; 198/468.6
[58] Field of Search .............. 198/468.2, 468.4, 468.5, 198/468.6, 774; 414/225, 226, 750–753

[56] References Cited

U.S. PATENT DOCUMENTS 3,003,615 10/1961 Ruppe ................................. 198/774
4,095,699 6/1978 O'Neil ............................. 198/468.2

Primary Examiner—Joseph E. Valenza
Attorney, Agent, or Firm—McGlew and Tuttle

[57] ABSTRACT

The invention is concerned with a positioning device for the feed of objects along a feed path made up of a number of sections running in different directions. Feed motion takes place using a single object holder, which during the entire feed stroke is coupled with the piston rod of a piston and cylinder actuator. The holder is furthermore positively steered along the feed path by a cam with a positive action and the cylinder is so mounted on a stationary pivot member that it is able to perform a movement made up of two components of motion extending at right angles to each other.

7 Claims, 3 Drawing Sheets

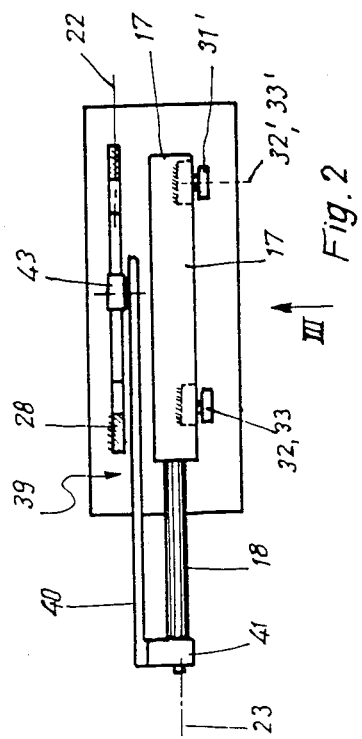
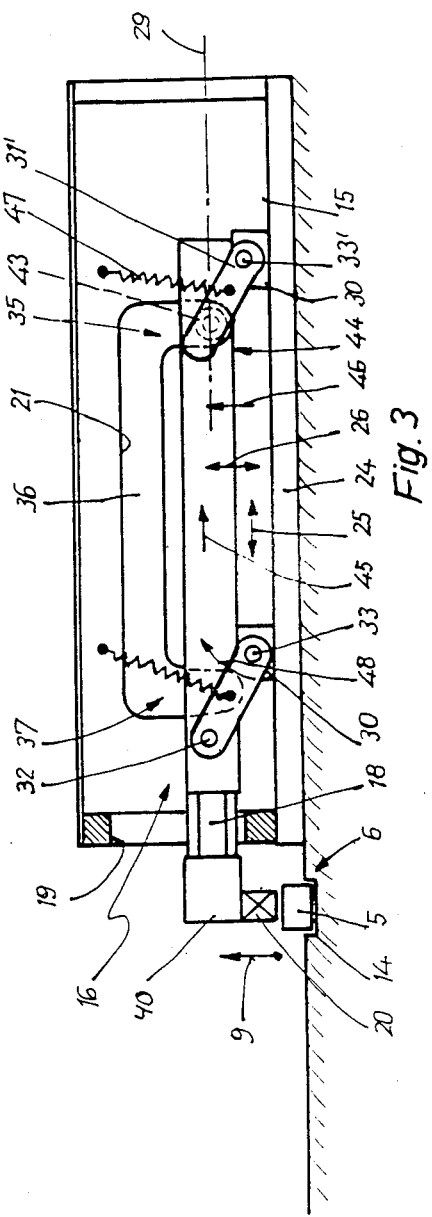

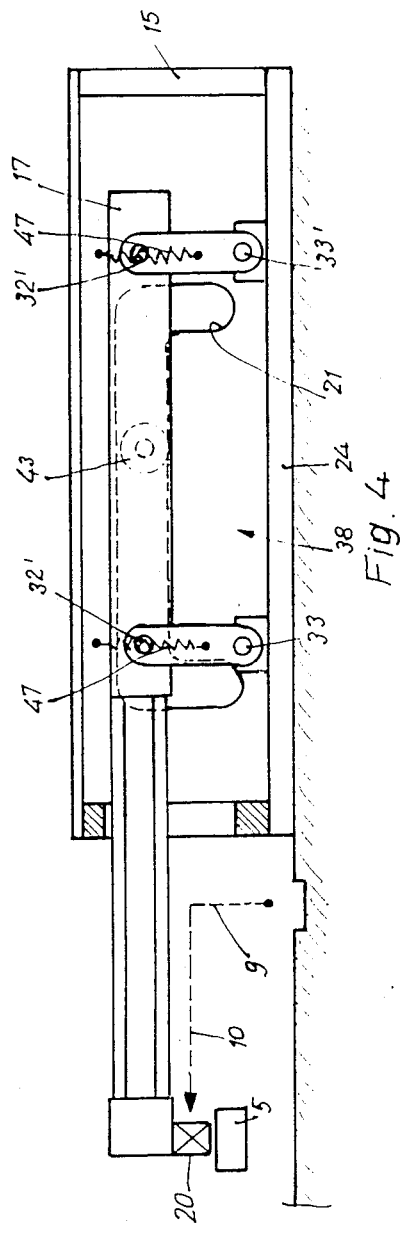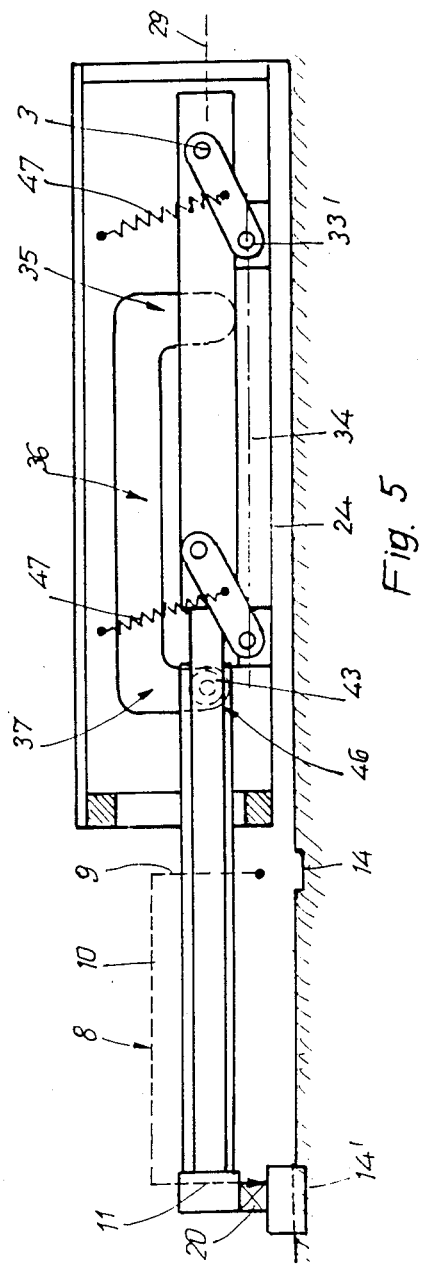

POSITIONING DEVICE

BACKGROUND OF THE INVENTION

The invention relates to a positioning device adapted to move objects along a feed path which is divided up into a number of sections all placed in a single, more particularly vertical plane, but running in different directions, using a holder, wherein such feed action more especially involves lifting, transport and lowering, the motion of the holder being produced in each feed path section by the motion of a piston and cylinder actuator.

If an object is to be moved from one point to another for positioning it, it is frequently impossible for motion to proceed along a single, direct or linear path; the path may be made up of a number of sections to ride past an intervening structure so that in each section the object is moved in different directions.

To take one example, an object which is placed on a support on which it is not possible for it be slid, firstly has to be lifted, then fed on the level and finally deposited at the desired point. Accordingly known positioning devices have a number of piston and cylinder actuators, one for each section of the path with one respective object holding means on their piston rods and which when moving the object have to pass it from one piston rod to another where one path section ends and another one begins. The feed path is thus divided up into a number of linear path sections. Since a number of suitably designed piston and cylinder units is required the structural complexity of known positioning devices is considerable and this makes them expensive. In addition, a complex controller is required in order to make possible synchronous transfer operations between the separate piston and cylinder actuators. Even so, transfer is not always perfect, for example because of jolts which in some cases may be the cause of damage to the objects being positioned. A further point to be considered is that owing to the division of tha path into sections the complete cycle will be slow and this is a disadvantage when use in mass production is contemplated, where high handling rates are required. Last but not least, abrupt acceleration and deceleration of the objects due to the motion of the separate piston rods lead to a very jerky handling action during feed.

It is also to be noted in this connection that known positioning devices have a very large overall size so that they may only be used at one particular point and they may not be shifted at short notice to another point of application.

SHORT SUMMARY OF THE PRESENT INVENTION

Accordingly one object of the present invention is to create a positioning device of the initially specified type which has a simple and compact mechanical design.

A further aim of the invention is to devise such a positioner which acts quickly.

In order to achieve these or other objects appearing from the present specification and claims, the positioning device of the instant invention comprises a single holder in the form, for instance, of a suction or mechanical gripping unit, which during the entire feed motion along the feed path is coupled with a piston rod of a single piston and cylinder actuator, and during the lifting motion of the piston and cylinder actuator the holder is positively guided along a cam section describing the feed path and arranged in a single plane, the cylinder of the piston and cylinder actuator being so supported on a support path which is stationary in relation to the cam that it is able to perform a movement made up of a section of motion which extends at a right angle to its longitudinal axis or direction of lifting and parallel to the plane of the cam section.

The positioning of an object is now possible with only one single piston and cylinder actuator so that the structural complexity and costs are considerably decreased. Owing to the absence of complex transfer operations the operation of the device is greatly simplified and the feed of an object becomes highly reliable. The absence of control of motion along the path point by point, necessary in the prior art to cause changes in direction, at the same time leads to an increase in the speed of feeding the objects, since the individual positioning cycles take place in sequence with a continuous, smooth action without any interruptions. The object is able to make its way along the path with an uninterrupted and jolt-free, controlled sweeping motion. Positioning may take place with a great economy in time since a single positioning cycle involves only one single motion of the piston rod inwards and outwards, this making the device of the invention predestined for use in mass production. The particular supporting means for the cylinder makes possible the degrees of freedom of motion necessary for reliable motion of the holder and the object while at the same time providing a precise supporting action. This also fulfills the condition necessary involved in the case of a path section extending transversely or at a right angle to the longitudinal axis of the cylinder, that is to say that the actuation of the piston and cylinder unit itself starts the positioning process and an additional force acting from the outside is not required. The compact structure of the device makes possible flexible use at any desired point.

Advantageous further features of the invention will be seen from the claims.

It is frequently the case that a positioning operation involves the removal of the object from a support location, feed to another point and its deposit at a further support location. The removal and deposit or insertion then have to take place along precisely linear path sections, whose direction will most frequently be vertical. So far this has been done by so aligning the piston and cylinder unit for the first and the third path sections that its longitudinal direction coincided with the direction of lifting and lowering. In the present invention the cam may be conveniently made up of a first cam section extending at a right angle in relation to the cylinder axis of the piston and cylinder actuator, then an adjoining second path section extending at a right angle in relation to the first section and preferably a third section which then extends at right angle in relation to the second section so that in the positioning cycle the holder with the object being fed is sequentially lifted, transported and then deposited again, the first and/or the second and/or the third section of the path having a linear form. It is furthermore possible for the first and the second path sections to be arranged essentially perpendicularly to each other with the second section and third sections of the path, for example being essentially perpendicular to each other. It is also possible for the cam to have a U-like form with the opening thereof directed downwards in one possible position of use of the device, the cam having first and third vertical sections and a horizontal second section connecting them together. These features mean that the device ensures a linear, and more especially vertical lifting and lowering of the object to be positioned and of its holder due to the suitable design of the cam with its preferably U-like form.

In accordance with a further feature of the invention positive guiding of the holder in relation to the cam is ensured by causing the holder to cooperate directly with the cam or indirectly via the piston rod carrying the holder or via a guide device arranged on the piston rod or the holder, the positive guiding action of the holder on the cam being possibly caused by a slide guide arrangement in which a sliding shoe connected with the holder slides in the cam, which is in the form of a rail or of a member with a groove therein. This is the preferred way of keeping the holder in engagement with the cam.

In order to support the cylinder it is possible to have two pivoting link arms which pivot at one end on the cylinder and on the support part at a distance from the cylinder support point, the two cylinder support points being arranged with some distance between them in the length direction of the cylinder, all the pivot axes being parallel to each other and generally at a right angle to the cam. The distance between the cylinder support point and the support point on the support part of the two pivot link arms may be the same, the plane of the pivot axes of the support points of the support part running parallel to the longitudinal axis of the cylinder so that the four pivot points are at the corners of an articulated parallelogram. These features provide advantageous ways for supporting the cylinder.

The cylinder may be arranged to be able to be reciprocated between two terminal positions in which the two cylinder support points are placed in front of and behind, as seen in the direction of the length of the cylinder, the respective associated support point and are arranged spaced apart in the a direction athwart the cylinder longitudinal axis so that they are oblique in relation to a plane containing the pivot axes of the support part support points and, for instance, in the terminal positions of the cylinder the holder engages one of the cam sections directed away from the second cam section with a positive guiding effect. This feature makes it possible for the object to be positioned to be rapidly taken up, whatever its actual position, and to be reliably shifted.

In accordance with a further feature of the invention, on the free end part of the piston rod there is a guide part, forming part of the guide means, extending in the longitudinal direction of the piston rod and alongside same, the end part of the guide part adjacent to the cylinder preferably being fitted with a sliding follower, a follower support wheel or the like which engages the cam with a positive guiding action. This feature ensures a positive guiding action for the holder with a low wear rate.

It is furthermore possible for the cylinder to be connected with springs which at one end are connected with the pivot link arms and at the other end are connected with a part which is fixed in position in relation to the cam. This feature serves to suppress any vibrations of the piston and cylinder actuator so that precise movements are possible.

A more detailed account of the invention will now be given referring to the accompanying drawings.

LIST OF THE SEVERAL FIGURES OF THE DRAWINGS

FIG. 2 is a section through the device of FIG. 1 looking downwards and on the section line II—II.

FIGS. 3 to 5 show the positioning device of FIG. 2 from the side looking in the direction of arrow II, the housing wall being omitted, to indicate various phases in the positioning cycle.

Figure 1:
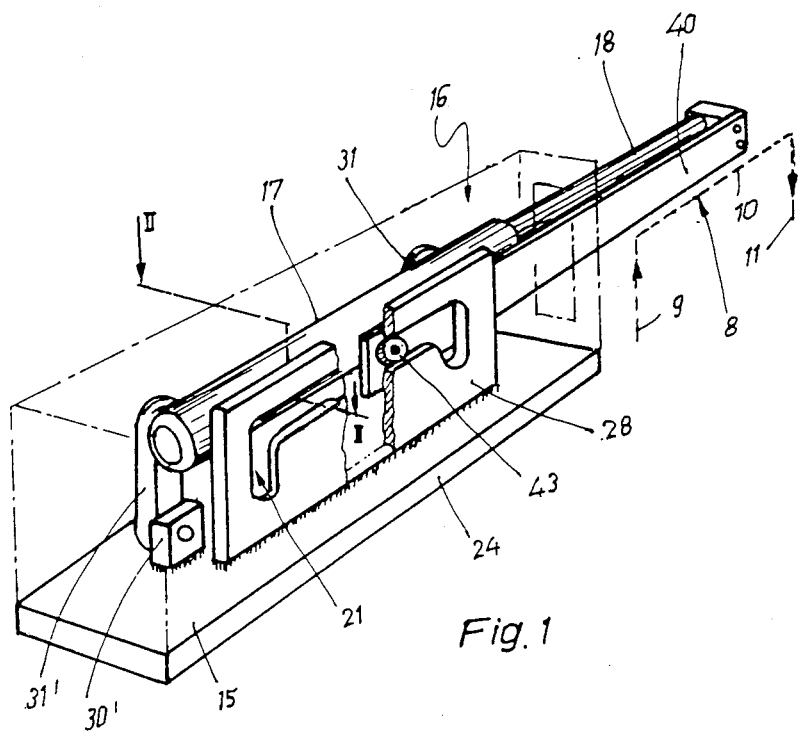
FIG. 1 shows a first positioning device in accordance with the invention in perspective, the housing being indicated in broken lines.

DETAILED ACCOUNT OF THE INVENTION.

The positioning device embodying the invention as shown in the figures serves to feed objects 5 between an initial location 6 and a terminal location 7 in a positioning cycle (see FIGS. 3 to 5). The positioning device may for example form part of the equipment of an assembly line in which it transfers the objects from the initial location 6, into which they are delivered by a conveyor, precisely into the terminal position 7 in the course of the positioning cycle. In the terminal position 7 the objects may be processed in some way or they may be passed on to another position. The positioning device is therefore able to be utilized as a handling unit too.

The positioning device enables the objects 5, which are to be positioned, to be transferred from the initial location 6 into the terminal location 7 along a feed path 8 (marked in broken lines) which is made up of different path sections 9, 10 and 11 extending in different directions. In the working examples of the invention illustrated the generally vertical first path section 9 involves the lifting of the object 5, whereas in the adjoining horizontally aligned second path section the object is to be transported or fed and in the next subsequent path section 11 it is question of lowering the object. Such a conveying action, which is not linear, is necessary when a direct feed or shifting of the object is to take place without dragging it along on a table or it there is a discontinuity between the two locations 6 and 7.

In the case of the working examples shown in FIGS. 3 to 5 the initial location 6 and the terminal location 7 are at the same level and in the two positions the object is to be taken from a support location 14 in a first linear vertical motion and is to be deposited in at support location 14'. The following parts of the description relate to such a manner of procedure, it having to be noted that the two locations 6 and 7 may quite clearly be at diffent levels, and in this case, if necessary, the device may be at a slope and not on the level as in the figures.

The positioning device in accordance with the invention comprises a prismatic, elongated housing 15 in which the cylinder 17 of a piston and cylinder actuator 16 is mounted. The cylinder 17 contains a piston, not visible in the drawing, which is joined to a piston rod 18, which for its part protrudes from one axial end of the cylinder. It is a question of a double acting device, that is to say one whose piston rod 18 may be caused to extend for different distances from the cylinder by pressurizing and venting the two piston spaces in the cylinder.

At the end of the housing 15 from which the piston rod 18 extends there is an opening 19, through which the piston rod 18 protrudes from the housing. On the end part of the piston rod 18 sticking out of the housing there is a holder 20, which in the present working example of the of the invention is embodied in the form of a vacuum device, which may hold the objects 5 with a suction action. In place of this suction means it would also be possible to provide a magnetic or mechanical gripping device.

In order to feed the respective object 5, the holder 20 is to be shifted along the path 8 by operation of the piston and cylinder actuator, the directional control of the holder 20 being provided by a cam 21 during the entire positioning cycle. In fact the holder is positively guided on the cam during the said cycle, the cam being tailored to correspond with the desired path configuration so that it steers the object along the same. The cam 21 is located in a plane 22, which is parallel to the conveying plane 23 and spaced therefrom (see FIG. 2), although it might also coincide with it.

The cylinder 17 is supported on a support part 24, which is fixed in relation to the cam 21 and which in the present working example of the invention is constituted by the bottom of the housing. The cylinder is mounted on this support path in such a way that it may perform a movement made up of two components of motion, of which one is parallel (see arrow 25) and the other is at a right angle (arrow 26) to the longitudinal direction 29 of the cylinder 17, which coincides with the direction of the stroke of the cylinder. The two components of motion are in a plane which is plane-parallel to the plane 22 containing the cam.

This design ensures that on operation of the piston and cylinder actuator the cylinder 17 has the degrees of freedom needed in order to adapt its position to that of the holder 20 as the latter makes its way along the feed path 8.

The following account will give a more detailed picture of the invention.

For supporting the cylinder 17, which is aligned in the longitudinal direction of the housing, there are pivot mounts 30 and 30', respectively, on which pivoting link arms 31 and 31', respectively, are attached by turnpins at their lower ends. These link arms 31 and 31' have their opposite ends pivoted to the outside of the cylinder. All the four pivot axes are arranged to run in parallelism to each other, the distance, as measured in the length direction 29, of the pivot turnpins 32 and 32' arranged on the cylinder 17 being exactly equal to the distance of the pivot turnpins 33 and 33' on the support part 24 at the pivot mounts 30 and 30'. Furthermore, the pivot axes are arranged so as to be at a right angle to the plane of the cam 21 and the distance between the turnpins 32 and 32' and the pivot turnpins 33 and 33' on the support part is identical in the case of both link arms 31 and 31'. The two pivot turnpins 33 and 33' are in a plane 34 parallel to the longitudinal direction 29 of the cylinder 17 and the configuration is therefore one of an articulated parallelogram with four pivot turnpins 32, 32', 33 and 33' at the corners.

The interior of the housing also accommodates the cam 21, which has the form of a slot-like opening through the cam plate 28, mounted in a upright position on the support part 24. As viewed in the length direction 29 of the cylinder and in plan it is to be seen alongside the cylinder 27, which has the link arms 31 and 31' adjacent to its other side. The pivot mounts 30 and 30' are located between the cylinder 17 and the support part 24.

The shape of the cam 21, that is to say the course thereof as considered in the longitudinal direction corresponds to the course of the feed path 8. It is for this reason that adjacent to the back end of the cylinder remote from the piston rod 18 the cam 21 firstly has a first cam section 35 running at a right angle to the cylinder axis so as to be vertical in the position of use illustrated. This section of the path is linear like the next adjoining second cam section 36 with a curved part, running parallel to the longitudinal axis of the cylinder and in a horizontal direction. This section 36 adjoins a third section 36 which is parallel to the first section 35 and runs in a vertical direction. It will be seen that the cam 21 is in the form of a letter U, the opening of the U being directed downwards towards the support part 24.

In the present working example of the invention the positive guiding or interengaging cam action of the holder 20 in relation to the cam 21 is due to a guide means 39, which has a guide part 40, which is connected by an intermediate part 41 to the end of the piston rod, which is outside the cylinder 17. The guide part is generally in the form of a rail and has a length generally equal to that of the piston rod 18 and extends in parallelism to the same directly adjacent to the piston and cylinder actuator. The guide part 40 is mounted in a cantilever fashion on the intermediate part 41 so that its end section 42, remote from the intermediate part 41, is in the space between the plate 28 and the cylinder 17 (see FIG. 2). In the section 42 it carries a follower roller 43 cooperating with the cam 21 and running along it.

If now the follower roller 43 starts moving from the initial position as seen in FIG. 3 along the first section 35 of the cam 21 the holder 20 and therefore the object 5 thereon, will describe the initially noted path section.

The shape of the cam as illustrated is more especially an advantage if objects are to be moved linearly from a support location or are to be deposited at a support location. Furthermore the cam shape may be customized to suit the individual application, i. e. the form of the feed path. It is for example possible to make sections of the cam in an arcuate form or, in a manner more similar to what is shown in the drawings, to have the two end sections 35 and 37 at angles which are greater or less that 90° in relation to the horizontal cam section 36, i.e. to make them oblique.

It is to be noted that the cam may for example be arranged alongside the extended piston rod and in this case the positive camming action may be caused by a direct guiding of the holder in the cam or however by cooperation of the piston rod with the cam (not shown).

The following account is devoted to the function of the positioning device of the invention.

FIG. 3 shows the basic or initial setting in the positioning cycle. The piston rod 18 is more or less completely retracted into the cylinder 17 and the holder 20 is holding the object 5, while the follower roller 43 is located in an end section 44 of the cam 21 in the section 35. Furthermore the cylinder 17 is arranged in the vicinity of the support part 24 and is on the pivot mounts 30 and 30'. As considered in the length direction 29 of the cylinder, the pivot turnpins 32 and 32' of the link arms 31 and 31' are in front of the associated support part pivot pins 33 and 33' towards the holder 20 so that there is parallelogram configuration in which the link arms 31 and 31' are oblique in relation to the support part 24 and point forwards and upwards from the mounts 30 and 30' towards the opening 19.

The piston and cylinder actuator is now put under pressure so that the piston rod 18 will be urged outwards. Since, however, the direction of the cam in the section 35 thereof is at a right angle to the longitudinal direction of the cylinder and in this section the follower roller 43, connected with the piston rod 18, engages the cam, the motion of the piston rod 18 is opposed and it would not be able to move out of the housing if it were not for the particular pivot mounting of the cylinder 17 which means that with a simultaneous pivoting action of the link arms 31 and 31' as indicated by the arrow 48, the cylinder moves back in the direction of the arrow 45 opposite to the direction of the holder 20 and at the same time moves up as indicated by the arrow 46 away from the support part 24. Then follower roller 43 moves upwards until it arrives at the transitional part running into the second cam section 36 and the object 5 will now have completed the path section 9.

The link arms 31 and 31' are at a right angle to the longitudinal direction 29 of the cylinder and further pivoting is precluded by the horizontal cam section 36. Accordingly the cylinder will stop and it will be possible for the piston rod 18 to move out of the cylinder and the housing 15 in relation to the support part 24. A halfway stage of the extension motion is shown in FIG. 4, in which the holder 20 is in the second feed section 10 at this time.

When the follower roller 43 reaches the transition leading into the third, vertical cam section 37, the outward motion of the piston rod 18 is braked and the link arms 31 and 31' are able to swing around as far as they will go, since the follower roller 43 is able to move downwards towards the end of the cam section 37. The cylinder 17 then moves a certain degree in relation to the piston rod 18, for which reason the maximum extension stroke of the piston rod in relation to the cylinder 17 has to be larger than the length of the cam section 36.

FIG. 5 now shows the setting in which the object 5 has been shifted into its terminal position after it has moved along the third feed section 11 as well. As compared with the initial setting, the link arms 31 and 31' are inclined downwards in relation to the housing 15 and thus assume a position which is exactly symmetrical in relation to the initial position and the cylinder 17 is again resting on the pivot mounts 30 and 30', although it is set back from the opening 19 by a distance equal to the distance moved on pivoting.

In order to return into the initial position motion may take place in the opposite direction to the course of motion described.

As indicated in FIGS. 3 through 5 it is possible for a tension spring 47 to be connected with each of the link arms, the other ends of such springs being anchored on the top side of the housing opposite to the support part 24, this serving to assist the starting motion of the holder 20 when the follower roller 43 is at one of the vertical end sections of the cam.

The means for supporting the cylinder 17 might also be in the form of a cam arranged on the support path 24 and in which the turnpins 32 and 32' may be shifted; preferably the cam means will be in the form of arcs.

Preferably as well there will be a control device to cause the motion of the holder 20 to be in synchronism with the respective object-engaging and object-releasing operation on the object 5.

I claim:

1. A positioning device adapted to move an object along a feed path made up of a number of path sections contained in a single feed plane comprising: a support part and a piston and cylinder actuator arranged thereon, said piston and cylinder actuator having a cylinder and a piston rod extending therefrom, an object holder arranged on the piston rod of said piston and cylinder actuator, a cam with a positive follower means connecting it with said object holder for steering same along said path with a change in the direction of its motion between said path sections, and mounting means carrying said piston and cylinder actuator in such a way that it is able to perform a movement made up of two components of which a first component is parallel to a longitudinal axis of the piston and cylinder actuator and a second component is at a right angle thereto, said two components being in a plane which is plane-parallel to said plane containing the path sections with provision for converting a thrust on said cylinder in the first direction into said second motion component, wherein there are two link arms and two pivot mounts on which one end of each link arm is respectively pivoted for swinging motion about first and second pivot axes, said pivot mounts being spaced apart in the direction of the cylinder axis, respective opposite ends of said link arms being pivoted to said cylinder for swinging motion about third and fourth pivot axes, said first, second, third and fourth pivot axes being parallel to each other and generally normal to the plane containing the cam.

2. The positioning device as claimed in claim 1 wherein the distance between the first and second pivot axes is equal to the distance between the third and fourth pivot axes, the first and second pivot axes being in a plane which is parallel to the longitudinal axis of the cylinder so that the four said pivot axes are at the corners of an articulated parallelogram.

3. The positioning device as claimed in claim 1 wherein said cylinder is able to be shifted between two terminal positions, in which the third and fourth pivot axes are spaced out in front of and, respectively, behind the first and second pivot axes as considered in the length direction of the cylinder, said link arms being inclined in said terminal positions.

4. The positioning device as claimed in claim 3 wherein said holder is in positive cam following cooperation with first and third sections of said cam facing away from said second cam section in said terminal positions.

5. A positioning device comprising a cylinder, a piston movable in the axial direction in said cylinder and having a piston rod extending out of one end of said cylinder, said piston rod having an article holder portion, a cam extending along one side of said cylinder substantially in a plane corresponding to an article carrying plane, a cylinder support, a pair of upright, spaced-apart link members arranged in a plane on said support which is substantially parallel to said article carrying plane and parallel to the longitudinal axis of said cylinder, a respective link for each link support, each having one end pivoted to each support and opposite ends pivoted to a side of said cylinder at spaced-apart longitudinal locations, said links being parallel to each other and having pivot axes at right angles to the plane of said cam, said cam defining a confining cam slot, a guide member connected to the end of said piston rod which extends out of said cylinder and having a surface parallel to the axis of said cylinder, a roller follower mounted on said guide member surface extending outwardly therefrom on a side thereof opposite to said links and engaged in said cam confining slot, and said slot having at least one horizontal portion and at least two vertical portions.

6. A positioning arrangement according to claim 5, wherein one section of said cam slot extends parallel to the longitudinal cylinder axis.

7. A positioning arrangement according to claim 6, wherein the link members are biased by springs.

* * * * *